SUBSTRATE PROCESSING APPARATUS

Filed Sept. 10, 1959 4 Sheets-Sheet 1

INVENTORS
NICHOLAS THEODOSEAU
GEORGE J. KAHAN
EDWARD M. DA SILVA
FRANCIS S. DE CORMIER
BY Frederick J. Smyth
ATTORNEY March 6, 1962 N. THEODOSEAU ET AL 3,023,727

SUBSTRATE PROCESSING APPARATUS

Filed Sept. 10, 1959 4 Sheets-Sheet 3

United States Patent Office 3,023,727

Patented Mar. 6, 1962

3,023,727

SUBSTRATE PROCESSING APPARATUS

Nicholas Theodoseau, Staatsburg, George J. Kahan, Port Washington, and Edward M. Da Silva and Francis S. De Cormier, Poughkeepsie, N.Y., assignors to International Business Machines Corporation, New York, N.Y., a corporation of New York Filed Sept. 10, 1959, Ser. No. 839,219
7 Claims. (Cl. 118—9)

This invention relates to a substrate processing apparatus, and more particularly to an apparatus for applying one or more vacuum evaporated coatings to a plurality of substrates.

Vacuum evaporated coatings have been employed in the fabrication of lenses, mirrors, magnetic tapes, capacitors, and, more recently, transistors. Generally, each of these articles require only single layer coatings and various types of apparatus have been developed to produce these coatings in a economic and efficient manner.

Still more recently, however, there have been developed new cryogenic type circuit elements for use in computers and other electronic devices. One type of cryogenic circuit element is described in copending application Serial No. 625,512 filed November 30, 1956, on behalf of Richard L. Garwin and assigned to the assignee of this application. These elements are conveniently fabricated to form complex electrical circuits by successively evaporating onto a substrate, a number of juxtaposed and superimposed coatings of metals and insulators, each having a predetermined pattern. By this means, various electrical conductive paths are obtained, insulated one from another, and having diverse electrical characteristics throughout the length of each path.

Because of the many different combinations of patterns and coating layers necessary to produce complex electrical circuits consisting of the above referenced cryogenic elements, it has not been possible until now to fabricate more than one substrate during a single evacuation cycle of the vacuum chamber.

The apparatus of the invention, therefore, in order to process a plurality of substrates during a single evacuation cycle of the vacuum chamber, provides a plurality of work stations at which a complete coating may be deposited onto a substrate, as well as provisions for moving a substrate from work station to work station in order to obtain a number of coatings on the same substrate. Each of the work stations includes a fixed evaporation source structure and a pattern mask vertically aligned therewith. The pattern mask at each work station is selectively operated to be positioned in contact with the particular substrate located at the work station, in order to obtain proper registration of the deposited material on the substrate. Further, to ensure that a previously deposited coating is not damaged when a second mask is positioned in contact with a substrate, the apparatus of the invention includes a combination of a plurality of fixed studs and springs effective to first accurately align the mask and substrate. In this manner, any necessary lateral movement is accomplished before the mask and substrate are in contact. Additionally, means are provided at each work station for maintaining the substrate at a low temperature to reduce the mobility of the atoms of the vaporized material deposited on a substrate, in order that the atoms thus deposited are firmly positioned at predetermined locations as determined by the pattern mask.

Further, because the desired thickness of the various conductive coatings required for the previously referenced cryogenic circuits, is about 1000 Angstrom units, to obtain a high resistance and improved switching times, means are also provided to determine the thickness of the deposited coating during an evaporation operation.

In general, the apparatus according to the invention, comprises a bell jar mounted on a base plate, the interior volume of which is divided into a plurality of vertical sectors. The number of these sectors, or work stations, is equal to the maximum number of substrates the apparatus can process during a single evaporation cycle of the vacuum chamber. In a specific embodiment of the invention to be more particularly described hereinafter, the apparatus includes 24 work stations, each work station subtending an arc of 15 degrees, adapted to process a maximum of 24 substrates. Each of the 24 work stations includes the necessary components for depositing vaporized material onto a substrate through the pattern mask associated with the particular work station. Rigidly mounted to the base plate portion of each work station is an evaporation source structure containing the material to be vaporized at the particular work station. Vertically aligned with and in ascending order with the source structure at each work station are a rotatable evaporation shutter, a non-rotatable pattern mask, a substrate, rotatable from work station to work station, and a rigidly mounted cooling pad. The evaporation shutter is effective to shield all substrates except the one upon which vaporized material is to be deposited. Further, the shutter is rotatable in increments of 15 degrees to expose any substrate at any of the 24 work stations.

Located in the same plane as the substrates, are 24 monitor slides, one for each substrate, each slide being located on the same radial axis as a corresponding substrate. A portion of the volatilized material directed towards the substrate is deposited on a monitor slide, and this deposit is used to determine the thickness of the deposit on the substrate as hereinafter more particularly described. In order to process more than one substrate at a work station and to determine the thickness of each deposit thereon, a monitor slide shutter is also provided, located intermediate the source structure and the monitor slides. This shutter, is provided with 24 transverse slots, one for each monitor slide. The shutter is rotatable in increments of one degree to thereby expose a different portion of each slide during each evaporation from the same evaporation source.

Additionally, the rotatable evaporation shutter, intermediate the source structures and pattern masks is provided with a second opening located on the same radial axis as the substrate opening to simultaneously expose the monitor slide at the same work station as the substrate upon which material is being deposited.

A cooling pad, maintained at the temperature of liquid nitrogen is provided at all but one of the work stations to cool the substrates during an evaporation operation to ensure that deposited atoms firmly adhere to the substrate.

To process 24 substrates during a single evacuation of the vacuum chamber, four mechanical movements, controllable external the chamber, are required. To obtain multiple coatings on a single substrate, the substrates are rotatable in 15 degree increments, thus moving from work station to work station. The evaporation shutter is also rotatable in 15 degree increments to position the openings therein at a selected work station. The monitor slide shutter is rotatable through an arc of 15 degrees in one degree increments to expose 15 parallel portions of each monitor slide, to obtain a maximum of 15 separate evaporations from a single source structure. Finally, a vertical movement is transmitted to all the pattern masks to position them in contact with the substrates. These motions are transmitted through four centrally located cylindrical shafts as will be understood from the detailed discussion to follow.

An object of the invention is to provide an improved apparatus for processing a plurality of substrates within a vacuum chamber.

Another object of the invention is to provide an apparatus for applying one or more vacuum evaporated coatings to a plurality of substrates, wherein each coating has a predetermined pattern.

A further object of the invention is to provide an improved apparatus for producing cryogenic type electrical circuits.

Yet another object of the invention is to provide an improved apparatus for producing juxtaposed and superimposed coatings on a substrate wherein successive coatings are located with a high degree of accuracy.

Still another object of the invention is to provide an improved apparatus for applying vacuum evaporated coatings to a plurality of substrates, wherein the temperature of the substrate is accurately controlled during the evaporation interval.

Yet another object of the invention is to provide an improved apparatus for applying vacuum evaporated coatings to a plurality of substrates wherein the thickness of the coating is determined during the evaporation time.

The foregoing and other objects, features and advantages of the invention will be apparent from the following more particular description of preferred embodiments of the invention, as illustrated in the accompanying drawings.

Figure 1:
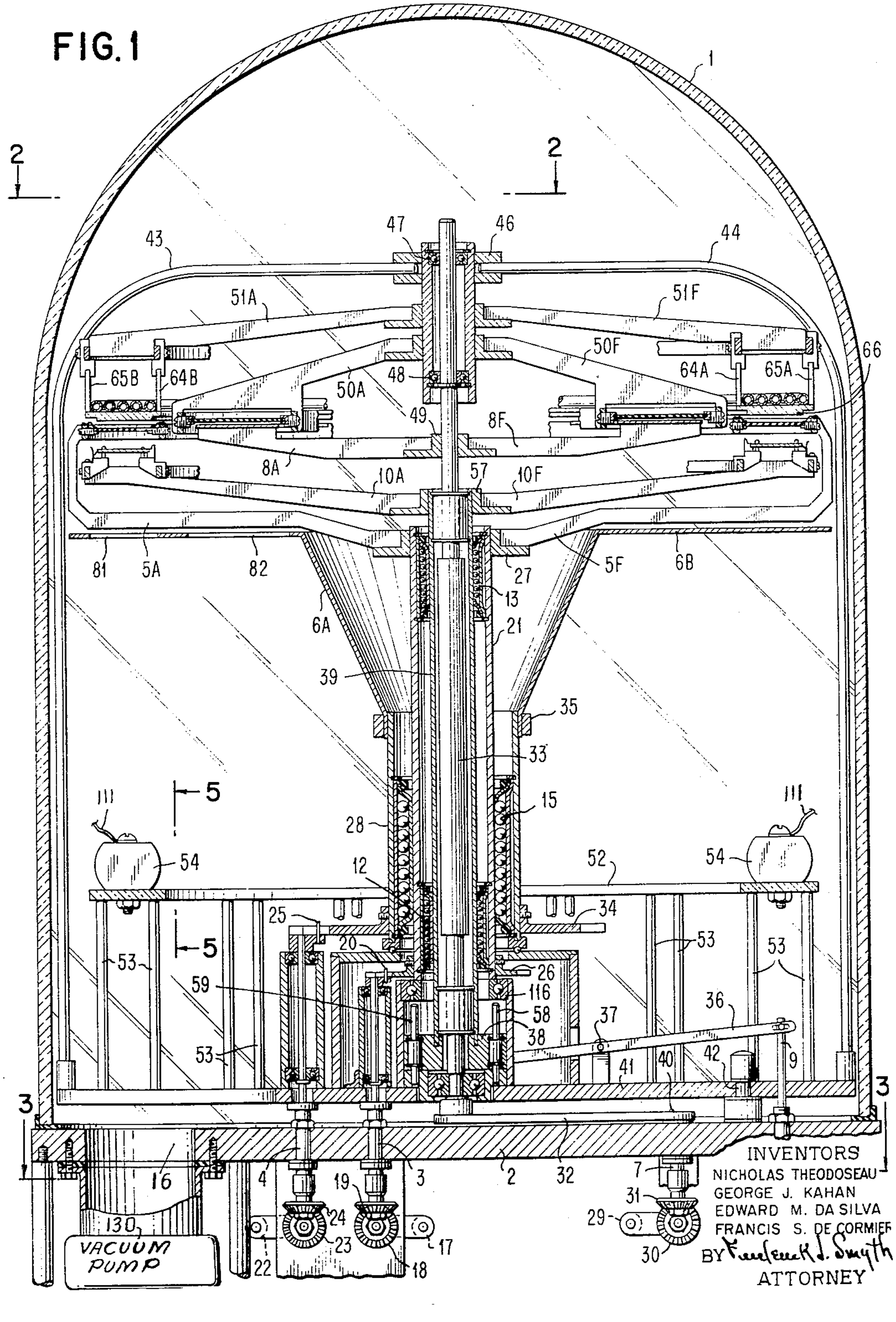
FIG. 1 is a cross-sectional view of an apparatus according to the invention.

Referring now to the drawings, FIG. 1 is a cross-sectional view of a specific embodiment of the apparatus of the invention, wherein 24 substrates may be processed during a single evacuation cycle. As shown in FIG. 1 the components of the apparatus are mounted within a vacuum chamber consisting of a bell jar 1 secured to a base plate 2. For reasons of clarity, only two work stations are shown but it will be understood as the description proceeds with reference to this and the other figures that 24 complete work stations are included with the vacuum chamber. Within bell jar 1, the apparatus is mounted upon a further base plate 41 which in turn is secured to base plate 2 by means of a plurality of spacers 42. Three equally spaced rods 43, 44 and 45 (see FIGS. 2 and 3 for rod 45) fastened to base plate 41 provide support for a spindle 46 which in turn supports four concentric shafts 21, 28, 33 and 39. Spindle 46 further provides support for two sets of radial arms. A first set of 12 arms 50A, 59B, 50C, etc., of which 50A and 50F are illustrated in FIG. 1, further support a pair of horizontal circular rails (55 and 56 of FIG. 2) between which 24 monitor slides 72A, 72B, 72C, etc. are secured by a plurality of set screws. Rails 55 and 56 have a radius less than the substrate supporting rails (75 and 76 of FIG. 2) and position the monitor slides in the same horizontal plane as the substrates. A second set of 12 arms, 51A, 51B, 51C, etc., supported by spindle 46, of which 51A and 51F are shown in FIG. 1, further position a circular cooling pad 66 immediately above the substrates through a group of 12 arms 64A and 65A, 64B and 65B, 64C and 65C etc. Again, only 64A and 65A, and 64F and 65F are shown in FIG. 1.

Located within the lower portion of bell jar 1, is an evaporation source structure mounting disk 52 secured to base plate 41 by a plurality of studs 53. Provisions are provided at each work station for mounting an evaporation source structure 54, or similar device. As more particularly explained hereinafter, source 54 is preferably fabricated of graphite and current flow therethrough is effective to heat the material to be vaporized. For this reason, disk 52 is fabricated of ceramic or other electrically non-conductive material.

Rotation is supplied to the substrates to move them from work station to work station under control of a crank 17, located external to the vacuum chamber. Crank 17 is pinned to one end of a shaft 11 (shown in detail in FIG. 3). The other end of shaft 11 is secured to a first bevel gear 18 which meshes with a second bevel gear 19. Secured to gear 19 is a shaft 3 which passes through base plate 2. Shaft 3 terminates in a Geneva roller 20 which is effective to intermittently engage a Geneva follower 26. Geneva roller 20 and Geneva follower 26 together provide a well-known Geneva drive mechanism and converts one revolution of crank 17 into a 15-degree rotation of Geneva follower 26. Pinned to Geneva follower 26 is a hollow circular shaft 21 positioned by means of a pair of bearings 12 and 13. Secured to the upper end of shaft 21 is a flange 27 which provides support for 12 radial arms 5A, 5B, 5C, etc., of which only 5A and 5F are illustrated in FIG. 1. Arms 5A, 5B, 5C, etc., further support a pair of horizontal circular rails (75 and 76 of FIG. 2) upon which the substrates to be processed are mounted as will be understood from a more detailed description to follow. By means of the mechanism just described, crank 17 is effective to rotate the substrates in increments of 15 degrees to position any of the 24 substrates at any of the 24 work stations.

By means of a similar mechanism, an evaporation shutter 6B can be rotated in 15 degree increments to position a pair of openings, 81 and 82, therein at any of the 24 work stations. This rotation of shutter 6B is under control of a crank 22 located external to the vacuum chamber. Crank 22 is pinned to one end of a shaft 14 (shown in detail in FIG. 3). The other end of shaft 14 is secured to a first bevel gear 23 which meshes with a second bevel gear 24. Secured to gear 24 is a shaft 4 which passes through base plate 2. Shaft 4 terminates in a Geneva roller 25 which is effective to intermittently engage a Geneva follower 34. Geneva roller 25 and Geneva follower 34 together provide a Geneva drive mechanism and are effective to convert one revolution of crank 22 into a 15 degree rotation of Geneva follower 34. Pinned to Geneva follower 34, is a hollow circular shaft 28 having a diameter greater than shaft 21 and located concentric therewith. Shaft 28 is positioned by means of bearing 15 which also permits either shaft 21 or shaft 28 to be rotated independently. Attached to the upper portion of shaft 28 is a clamp 35 for securing a truncated cone 6A which supports horizontal flat circular shutter 6B. Shutter 6B is provided with a pair of openings 81 and 82 located on the same radial axis. In this manner shutter 6B is effective to shield all substrates and monitor slides but one of each from the evaporation source structures to prevent unwanted material from depositing on any but the desired substrate and associated monitor slide. Shutter 6B is rotatable in 15 degree increments by means of the just described mechanism to position openings 81 and 82 over any evaporation source structure.

Figure 2:
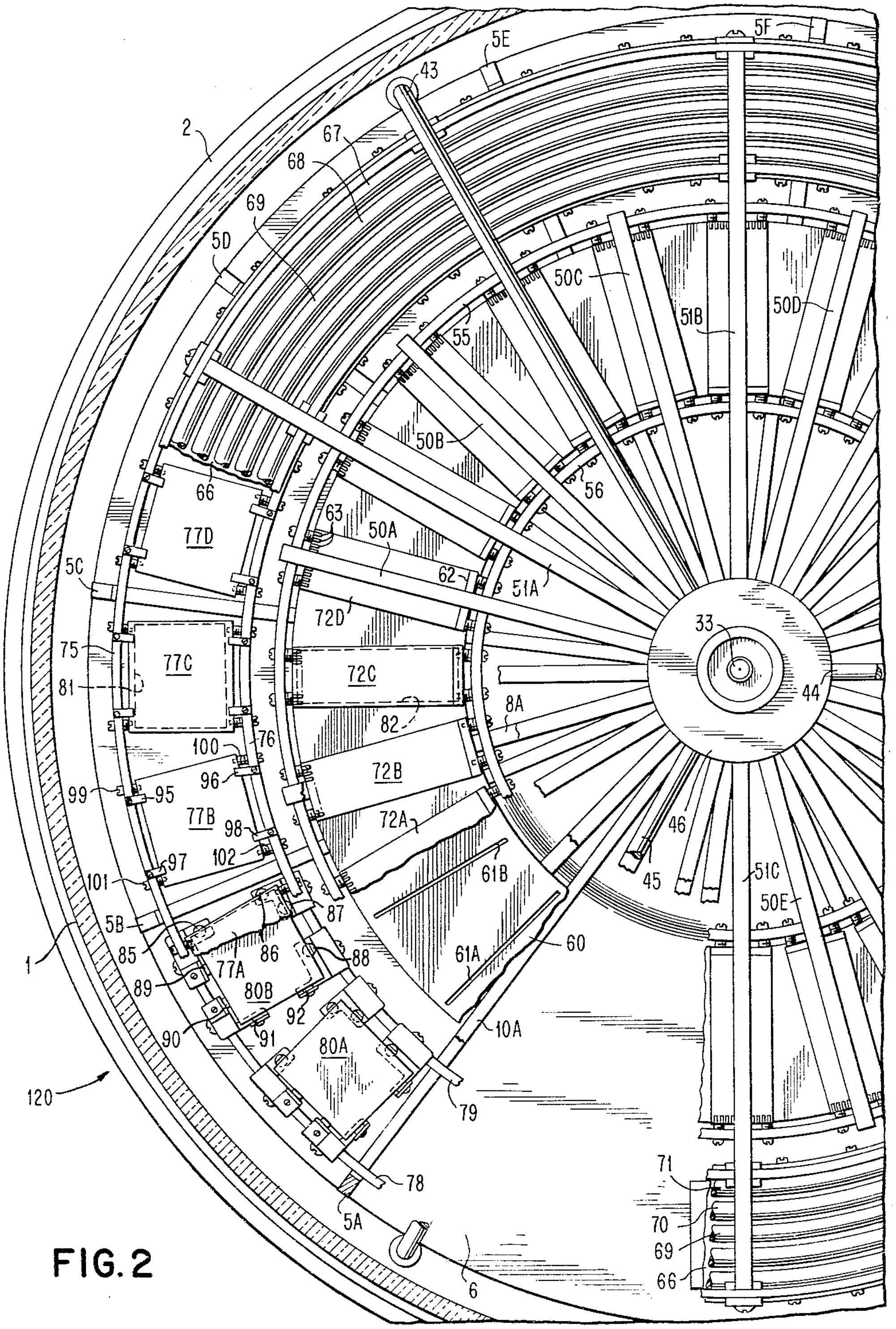
FIG. 2 is a sectional view taken generally along the lines 2—2 of FIG. 1.

As previously discussed, a monitor slide shutter, which is designated 60 in FIG. 2, requires a total rotation of only 15 degrees in increments of one degree. This results from the fact that the monitor slide shutter includes 24 radial slots one for each work station, to expose any of 15 predetermined portions of the monitor slide located at each work station. This motion,, although attained in a manner similar to the motions hereinbefore described, differs slightly therefrom. The required monitor slide shutter motion is again under control of a crank, designated as 29 in FIG. 1, located external to the vacuum system. Crank 29 is pinned to one end of a shaft 57 (shown in detail in FIG. 3). The other end of shaft 57 is secured to a first bevel gear 30 which meshes with a second bevel gear 31. Secured to gear 31 is a shaft 7 which passes through base plate 2. Shaft 3 terminates in a Geneva roller 40 which is effective to engage a segmentated Geneva follower 32 as shown in FIG. 1 and also in phantom in FIG. 3. Geneva roller 40 and segmentated Geneva follower 32 together provide a portion of a Geneva drive and are effective to convert one revolution of crank 29 into a one degree rotation of segmentated Geneva follower 32. Pinned to segmentated Geneva follower 32 is a solid circular shaft 33 having a lesser diameter than either shaft 21 and 28 and located concentric therewith. Shaft 33 is positioned by means of spindle 46 and is freely rotatable therein by means of a pair of bearings 47 and 48. Secured to an upper portion of shaft 33 is a flange 49 which provides support for 12 radial arms 8A, 8B, 8C, etc., of which only 8A and 8F are illustrated in FIG. 1. Arms 8A, 8B ,8C, etc. further support monitor slide shutter 60. By means of the mechanism just described, crank 29 is effective to rotate the monitor shutter 60 in increments of one degree through a 15 degree arc to simultaneously expose any of the 15 corresponding portions of the 24 monitor slides.

In order to vertically raise all the pattern masks so that each mask contacts a unique substrate to obtain proper registration of the vaporized material thereon, a fourth motion is required. This motion is controlled by the downward motion of a shaft 9 extending through base plate 2. Shaft 9 is pivotally connected to a lever 36. Lever 36 is also supported by a pivot 37 and attached to a piston 38. Downward motion of shaft 9 is effective to cause lever 36 to rotate about pivot 37 and raise piston 38 along a pair of rails 58 and 59. Secured to piston 38 is a hollow shaft 39 having a diameter greater than shaft 33 but less than shafts 21 and 28, and positioned concentrically therewith by means of bearings 12 and 13. Secured to the upper end of shaft 39 is a flange 57 which provides support for 12 radial arms 10A, 10B, 10C, etc., of which only 10A and 10F are illustrated in FIG. 1. Arms 10A, 10B, 10C, etc., further support a pair of horizontal circular rails (78 and 79 of FIG. 2) upon which the pattern masks are mounted as will be understood from a more detailed description to follow.

Figures 3, 7:
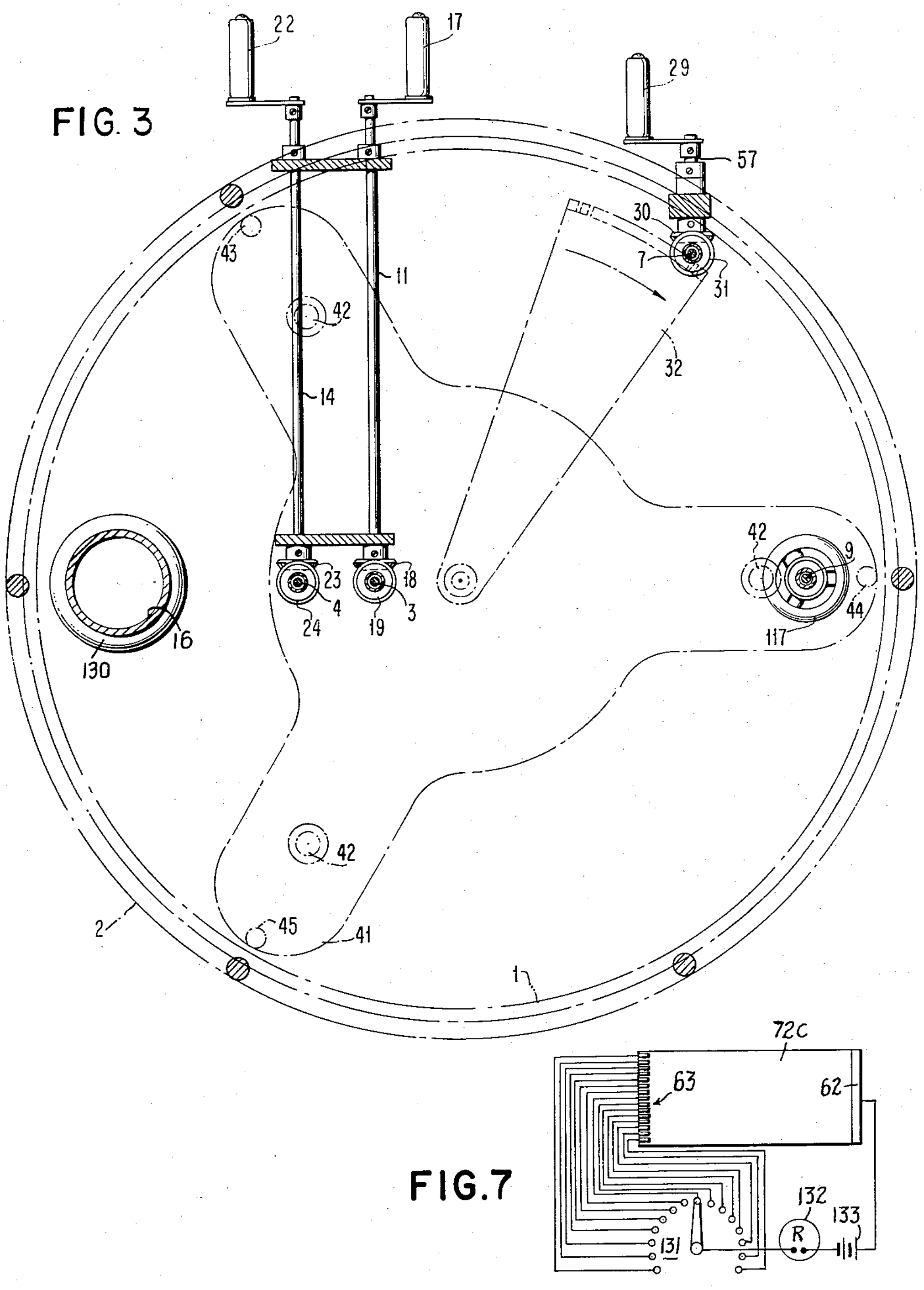
FIG. 3 is a sectional view taken generally along the lines 3—3 of FIG. 1, including selected elements located above the lines 3—3 indicated in phantom.
FIG. 7 is a schematic diagram of a portion of the deposition thickness monitoring system.

FIG. 2 illustrates the manner in which the various arms, substrates, masks, shutters, and slides are assembled. Arms 50A, 50B, 50C provide support for the stationary horizontal circular rails 55 and 56, between which are secured the 24 monitor slides 72A, 72B, 72C, etc., that are employed in determining the thickness of deposited coatings during an evaporation operation. These monitor slides are located adjacent each substrate and in the same plane therewith. Arms 8A, 8B, 8C, etc., which are located in the same vertical plane as arms 50A, 50B, 50C, etc., so that only 8A is visible in FIG. 2 provide support for the moveable monitor slide shutter 60. Shutter 60 has 24 narrow radial slots 61A, 61B, 61C, etc., one for each work station, spaced 15 degrees apart. As hereinbefore described, shutter 60 is rotatable in one degree increments under control of crank 29, Geneva mechanism 40 and 32, and shaft 33. By rotating shutter 60 one degree after each evaporation operation from a single evaporation source 54, 15 separate parallel thickness determining coatings may be deposited on the monitor slide 72 above the source 54. The thickness of the coating deposited on a slide 72 which is indicative of the thickness of the coating deposited on a corresponding substrate 77 is determined in the following manner. Each monitor slide 72A, 72B, 72C, etc., consists of an electrically nonconductive material, which may be glass or the like, having a conductive land 62 on one edge thereof and 15 individual conductive lands, indicated generally as 63 in FIG. 2, on the opposite edge thereof. By measuring the electrical resistance between the common land and one of the 15 lands 63 selected by shutter 60 during an evaporation operation, a determination of th coating thickness connecting these lands may be obtained, since the resistance of the coating decreases as the thickness increases. For purposes of clarity of illustration, the necessary wires connected to each of the monitor slides are not shown in FIG. 2, but it should be understood that they may be connected thereto in any convenient manner. By way of illustration, FIG. 7 shows a typical measuring circuit for monitor slide 72C. Each of lands 63 are individually connected to a selector switch 131, the common terminal of which is connected through resistance meter 132 and current source 133 to common land 62. By means of a second selected switch, the remaining monitor slides are selectively connected to the measuring circuit.

Stationary arms 51A, 51B, 51C, etc. which provide support for cooling pad 66 are also shown in FIG. 2. As will be understood from FIG. 1 which shows arms 51A and 51F, each of these arms supports a pair of thermal isolators 64A and 65A, 64B and 65B, etc., which may be quartz or the like, to which is secured cooling pad 66, covering an arc of 340 degrees. Preferably, cooling pad 66 is fabricated of copper or other high thermal conductance material. In contact with cooling pad 66 are five copper tubes 67, 68, 69, 70 and 71, having common input and output connections which are filled with liquid nitrogen or, alternatively, have liquid nitrogen continuously circulated therethrough. By this means, pad 66 is maintained at a temperature in the vicinity of 77 degrees Kelvin, and is effective during an evaporation to cool the substrates as more particularly hereinafter explained.

Arms 5A, 5B, 5C, etc. provide support for the moveable horizontal circular rails 75 and 76 upon which the substrates, such as 77A, 77B, 77C, etc., to be processed are mounted. The manner by which the substrates are mounted will be more particularly described hereinafter with reference to FIGS. 4A and 4B. As hereinbefore described, rails 75 and 76 are rotatable in 15 degree increments under control of crank 17, Geneva mechanism 20 and 36, and shaft 21. Below each arm 5A, 5B, 5C, etc., and located in the same vertical plane therewith are 12 arms 10A, 10B, 10C, etc., of which only 10A is visible in FIG. 2, which provide support for the non-rotatable horizontal circular rails 78 and 79 upon which are mounted the masks 80A, 80B, 80C, etc. Again, the method of mounting the masks will be hereinafter described with reference to FIGS. 4A and 4B. Also shown in FIG. 2 is rotatable shutter 6B having opening 81 to expose a substrate to an evaporation source and opening 82 to expose a corresponding monitor slide to the same evaporation source. Each of the openings 81 and 82 are located on the same radial axis and, as shown in FIG. 2, are positioned immediately below substrate 77C and monitor slide 72C. In this manner, shutter 6B is effective to shield all the substrates and monitor slides located at 23 of the 24 work stations.

As an aid in understanding the coaction between the elements hereinbefore described, the processing of a single substrate having three coatings will next be described, it should be understood however, that the apparatus of the invention may be employed to process 24 substrates having any number of coatings or, alternatively, to process 24 substrates having various coatings and patterns deposited thereon. As a first illustrative example, a substrate will be coated with a first electrically conductive material which may be, by way of example, tin, and a second electrically conductive material which may be, by way of example, lead; the first and second coatings insulated one from another by a third non-electrically conductive material which may be, by way of example, silicon monoxide.

With bell jar 1 removed from base plate 2, the pattern mask, for example 80B of FIG. 2, having predetermined openings therein (not shown in FIG. 2) through which it is desired to deposit tin onto a substrate, is mounted at a first work station 120. As shown in FIG. 2 (and FIG. 4A), the mask 80B is rigidly positioned at work station 120 by means of studs 85, 86, 87, and 88 (stud 88 is not shown in FIG. 4A) secured to rails 78 and 79 in combination with split-leaf springs 89, 90, 91, and 92, which are also secured to rails 78 and 79. The inner portion of springs 89 and 90 are effective to force mask 80A firmly against and in alignment with studs 87 and 88. The inner portion of springs 91 and 92 are effective to force mask 80B firmly against and in alignment with studs 85 and 86. By means of another similar combination of split-leaf springs and studs at a second work station, the mask containing the lead defining openings therein is positioned at the second work station. Since the insulating layer of silicon monoxide is required to completely cover the substrate, no mask is necessary.

A substrate, by way of example 77B of FIG. 2, next is secured to rails 75 and 76 at the work station having no cooling pad, it being remembered that cooling pad 66 extends only 340 degrees. Substrate 77B is yieldly secured to rails 75 and 76 by means of leaf springs 95, 96, 97, and 98, which, as shown in FIG. 2, are pinned to rails 75 and 76, in combination with the projections extending inwardly from set screws 99, 100, 101, and 102. It is understood that additional substrates, up to a maximum of 24, are mounted and secured by similar combinations of leaf springs and set screws.

Figure 5:
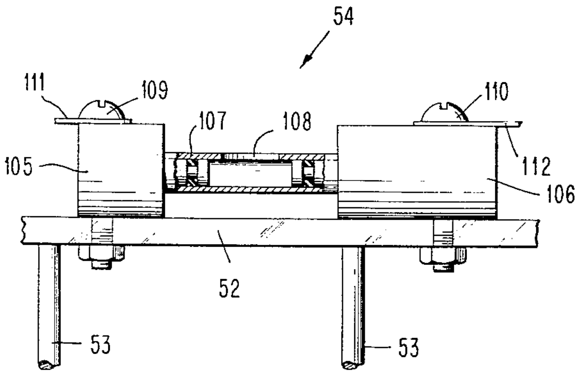
FIG. 5 illustrates an evaporation source structure useful in the apparatus of the invention.

Next, metallic tin is inserted in the evaporation source structure 54 at work station 120. FIG. 5 illustrates an evaporation source structure particularly useful in the apparatus of the invention. As shown therein, source structure 54 comprises a pair of solid relatively large diameter graphite end plugs 105 and 106, slidably engaged with a hollow relatively small diameter graphite center section 107, having an opening 108 therein. Each end plug 105 and 106 are secured to disk 52 by means of a pair of screws 109 and 110, under which are attached lugs 111 and 112 respectively. Because each of the end plugs 105 and 106 exhibit a low resistance to the flow of electrical current and center section 107 exhibits a relatively high resistance thereto, current flow between lugs 111 and 112 is effective to raise the temperature of the center section 107 sufficiently to volatilize the material therein.

Next, metallic lead is inserted in the evaporation source structure 54 located at the same work station that includes the lead defining pattern mask, and silicon monoxide is inserted in yet another evaporation source structure 54 at a work station at which no pattern mask is located. Crank 17 is then rotated in order to position substrate 77B at work station 120 immediately above mask 80B. Crank 29 is next operated in order to position slot 61A in shutter 60 vertically beneath a predetermined one of the multiple lands 63 of monitor slide 72A at work station 120, and since this is the first evaporation from evaporation source 54 located at work station 120, the first of the multiple lands is selected by shutter 60. A resistance meter, for example one arm of a Wheatstone bridge, or an accurate ohmmeter, is then connected between the predetermined one of the multiple lands 63 and the common land 62 of monitor slide 72A.

Figure 6:
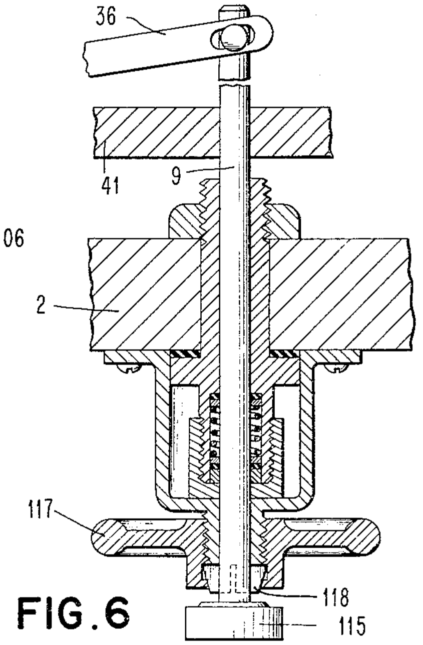
FIG. 6 is an enlarged cross-sectional view of the structure for locking the actuators for the pattern mask carrier arms of the apparatus of FIG. 1.

Referring now to FIG. 6, in conjunction with FIG. 1, there is shown in detail the portions of shaft 9 located external to the vacuum chamber. As is shown in FIG. 1, shaft 9 extends through base plate 2 and as shown in FIG. 6, terminates in a knob 115. Handle 117 is effective together with tapered spacer 118 to retard the movement of shaft 9. A downward movement is transmitted to shaft 9 by a pull downward knob 115. This downward motion of shaft 9 is transmitted to lever 36 which, rotating about pivot 37 raises piston 38 along rails 58 and 59 until the masks and substrates are contiguous with cooling pad 66, overtravel being prevented by means of stop 116. The movement of the masks and substrates will be described immediately below. Handle 117 when rotated clockwise is effective to lock shaft 9 in conjunction with tapered spacer 118.

Figure 4A:
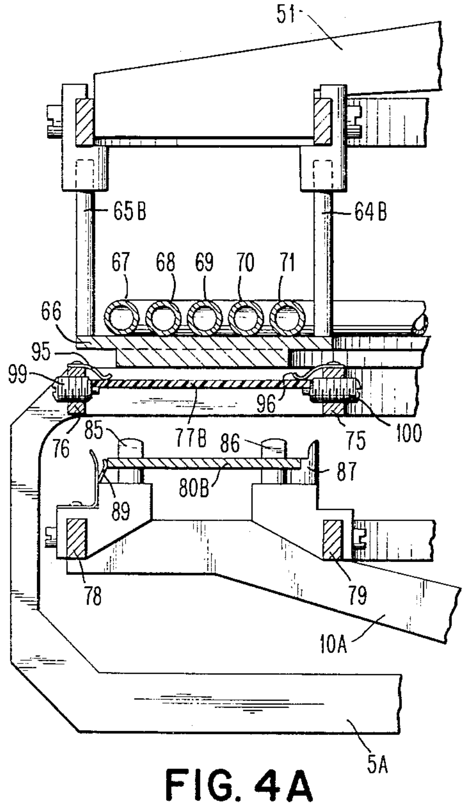
FIG. 4A is an enlarged view of a portion of the apparatus of FIG. 1 illustrating the relative positions of a substrate and pattern mask prior to coating.
Figure 4B:
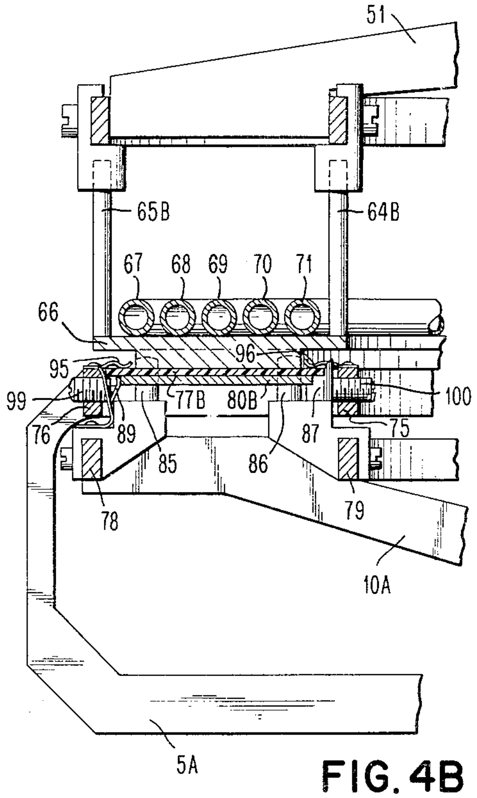
FIG. 4B is an enlarged view of a portion of the apparatus of FIG. 1 illustrating the relative positions of a substrate and pattern mask during coating.

Referring now to FIGS. 4A and 4B which show a particular mask 80B and substrate 77B, first separate in FIG. 4A and then together against cooling pad 66, in FIG. 4B it can be seen that arm 10A, which is operated by shaft 9, lever arm 36, piston 38 and shaft 33, elevates mask 80B to pick up substrate 77B and position both against cooling pad 66. Because substrate 77B may not be accurately positioned with respect to mask 80B self aligning means are provided to obtain accurate alignment. This is accomplished by the same studs 85, 86, 87, 88 and split-leaf springs 89, 90, 91, 92 (stud 88 and springs 90, 91, 92 not shown in FIGS. 4A and 4B) which secure pattern mask 80B to rails 78 and 79. As can be seen in FIG. 4B studs 85, 86 and 87 also engage substrate 77B and outer portion of springs 89, 90, 91 and 92 position and align substrate 77B therewith. In this manner substrate 77B is accurately located in relation to mask 80B, since the outer portion of split-leaf springs 89 and 90 position the substrate against the studs 87 and 88 and the outer portion of split-leaf springs 91 and 92 position the substrate against studs 85 and 86. Additionally, since the outer portion of these springs first pick up the corners of the substrate and position the substrate against the stationary studs, the substrate is accurately aligned with the mask, before the substrate and mask are in contact thus preventing damage to previously applied coatings. Any error that might be introduced by the effects of expansion or contraction of the indexing mechanism and tolerances of the substrate is essentially cancelled due to the adjusting flexibility of the positioning means.

Shutter 6B is then rotated by means of crank 22, Geneva mechanism 20 and 25, shaft 28 and shutter 6B so that openings 81 and 82 are positioned at a work station other than work station 120. Bell jar 1 is then secured to base plate 2 and after the desired vacuum is attained by means of a vacuum pump 130 connected through opening 16 in base plate 2, a predetermined current is caused to flow before terminals 111 and 112 (see FIG. 5) of evaporation source structure 54 containing tin, located at work station 120, to cause the tin to vaporize at a predetermined rate. When steady state evaporation of the tin has been attained, shutter 6B is rotated by means of the previously described mechanism to position openings 81 and 82 at work station 120 to allow volatilized tin to pass through opening 81, through the openings in pattern mask 80A, and deposit on substrate 77B, and to pass through opening 82, slot 61A of shutter 60, and deposit on slide 72A. As a deposition of tin proceeds an electrically conducted path will be formed on monitor slide 72A between the common land 62 and the predetermined one of lands 63, the resistance of which is indicative of the thickness of the tin deposited on substrate 77B. When the desired thickness of tin is attained on substrate 77B, as shown by the resistance meter monitoring the resistance of the conductive path formed on monitor slide 72A, shutter 6B is rotated so that openings 81 and 82 are no longer positioned at work station 120, and the current flow between terminals 111 and 112 and evaporation source 54 is stopped.

At this point, knob 117 (see FIG. 6) is rotated counterclockwise allowing shaft 9 to raise thus causing piston 38, guided by rails 58 and 59, to return to its "at rest" position. Shaft 33 likewise moves downward causing arms 10A, 10B, 10C, etc. to also move downward returning mask 80B to its normal "at rest" position and positioning substrate 77B between springs 95, 96, 97, and 98 and the projection of set screws 99, 100, 101, 102. Crank 17 is next operated to rotate substrate 77B by means of shaft 3, Geneva mechanism 20 and 26, shaft 21, horizontally until it is located at the work station at which evaporation source structure 54 contains silicon monoxide. Again a downward movement is transmitted to shaft 9 by a pull downward on knob 115 to position substrate 77B contiguous with cooling pad 66 in the manner previously described. Although no pattern mask is included at this work station, the studs and outer leaf springs of the split-leaf springs secured to rails 78 and 79 are effective to accurately position the substrate. Current is next supplied to the source structure at this work station, and shutter 6B is effective to block vaporized particles therefrom from arriving at the substrate and monitor slide until the desired evaporation rate is attained. At this time, shutter 6B is rotated by crank 22 until openings 81 and 82 are positioned at this work station. When the desired thickness of silicon monoxide is attained at substrate 77B, shutter 6B is rotated to position openings 81 and 82 at another work station and the deposition of the silicon monoxide ceases. Substrate 77B is then returned to rails 75 and 76 by again rotating handle 117 counter-clockwise to release shaft 9. Substrate 77B is next horizontally rotated to the work station at which source structure 54 contains lead, by means of crank 17. Again shaft 9 is pulled downward to position the lead defining mask and substrate 77B contiguous with cooling pad 66. Shutter 60 is then operated by means of crank 29, shaft 7, Geneva mechanism 32 and 40, shaft 33 to position slot 61 immediately below a predetermined one of lands 63 on the monitor slide 72. Current is then supplied to terminals 111 and 112 of the lead containing source structure 54 to volitalize the lead therein. When steady set evaporation of lead has been attained, shutter 6B is rotated to allow the volitalized lead to pass through opening 81 and the lead defining pattern mask to deposit on substrate 77B as well as opening 82, slot 61 of shutter 60 to deposit on monitor slide 72. When the desired thickness of lead is attained on substrate 77B as indicated by the resistance meter, monitoring the resistance of the lead conductive path formed on monitor slide 72, shutter 6B is rotated so that openings 81 and 82 are no longer at these operating work stations and the current to source structure 54 is stopped.

As a second illustrative example, 24 substrates may be similarly processed in a minimum number of evaporation steps by replacing shutter 6B with a second shutter 6C (not shown). Shutter 6C also is provided with a pair of openings located on the same radial axis, but whereas openings 81 and 82 of shutter 6B subtend an arc of 15 degrees, the openings in shutter 6C cover 120 degrees. Thus, shutter 6C simultaneously exposes eight substrates to eight evaporation source structures. Next, metallic tin is inserted in a first group of eight adjacent source structures, silicon monoxide is inserted in a second group of eight adjacent source structures, and metallic tin is inserted in a third group of eight adjacent source structures. Eight tin defining pattern masks are mounted on rails 78 and 79 above the tin containing source structures, and secured thereto by a combination of fixed studs and springs similar to studs 85, 86, 87, 88 and springs 89, 90, 91, 92 which secured mask 80B in the first illustrative example, as hereinbefore explained. By a similar procedure eight lead defining pattern masks are secured to rails 78 and 79 immediately above the source structures containing lead. As before, no masks are required at the eight work stations at which silicon monoxide has been inserted, since the silicon monoxide is required to completely insulate the tin and lead coatings one from another. 24 substrates are next secured to rails 75 and 76 by a combination of springs and setscrews similar to springs 95, 96 97, 98 and set screws 99, 100, 101, 102 which secured substrate 77B in the previously described example.

Crank 29 is then operated to position each of the slots 61A, 61B, 61C, etc. of shutter 60 beneath the first of the multiple lands 63 of each monitor slide 72A, 72B, 72C, etc. Eight resistance meters are next connected between each of the first of multiple lands 63 and the common land 62 of the monitor slides at the eight work stations containing the tin defining pattern masks. Alternatively, a single resistance meter may be employed which may be successively switched between the required terminals of the monitor slides. A downward motion is transmitted to shaft 9 by a pull downward on knob 115. This downward motion of shaft 9 is transmitted to lever 36, which rotating about pivot 37 raises piston 38 along rails 58 and 59 until the masks and substrates are contiguous with cooling pad 66. The masks and substrates are locked in this position under control of knob 117.

Bell jar 1 is then secured to base plate 2 and after the desired vacuum is attained, a predetermined current is caused to flow between each pair of terminals 111 and 112 of the eight source structures containing tin. When steady state evaporation of the tin has been attained, shutter 6C (not shown) is rotated, by means of the previously described mechanism under control of crank 22, to allow volatilized tin to pass therethrough and deposit on the eight substrates and monitor slides exposed by shutter 6C. When the desired thickness of tin has been attained, shutter 6C is rotated to shield the coated substrates from the tin containing source structures, and the tin deposition is stopped.

At this point knob 117 is rotated to free shaft 9 and allow the masks and substrates to return to the normal "at rest" position. Crank 17 is then rotated eight revolutions to position the first group of eight substrates having a tin coating above the eight source structures containing silicon monoxide, and the second group of eight substrates above the source structures containing tin. Again knob 115 is pulled downward and locked by means of knob 117, in order to position the masks and substrates contiguous with cooling pad 66. Crank 29 is then operated to rotate monitor slide 66 one degree. In this manner, each of the slots 61A, 61B, 61C, etc., in shutter 60 is positioned beneath a second of each of the multiple lands 63 of slides 72A, 72B, 72C, etc. The resistance meters are then connected between the second of the multiple lands 63 and the common land 62 of the monitor slides located at the eight work stations containing the tin defining pattern masks. As previously described, the second group of eight substrates are each coated with tin. Next current is applied to the eight source structures containing silicon monoxide, and shutter 6C is effective to block vaporized particles from arriving at the substrates until the desired evaporation rate is attained. At this time, shutter 6C is rotated by crank 22 to allow silicon monoxide to deposit on the first group of eight substrates having a tin coating. When the desired thickness of silicon monoxide is attained on these substrates, shutter 6C is rotated to shield these substrates and the deposition of silicon monoxide ceases. The substrates and pattern masks are returned to the normal "at rest" position by rotating knob 117 to release shaft 9. Crank 17 is next rotated eight revolutions to position the first group of eight substrates, which have a tin and silicon monoxide coating, above the lead defining pattern masks, the second group of eight substrates having a tin coating above the source structures containing silicon monoxide, and the third group of eight uncoated substrates above the tin defining pattern masks.

Knob 115 is again pulled downward and locked by knob 117 to position the masks and substrates contiguous with cooling pad 66. Crank 29 is next operated to rotate shutter 60 one degree in order that each of the slots 61A, 61B, 61C, etc., therein expose a third of each of the multiple lands 63 of slides 72A, 72B, 72C, etc. The resistance meters are then connected between the third of the multiple lands 63 and the common lands 62 of the monitor slides located at the eight mask stations containing the tin defining pattern masks. As previously described, the third group of eight substrates are each coated with tin and then the second group of eight substrates having a tin coating, are coated with silicon monoxide. At this point the resistance meters are connected between the third of the multiple lands 63 and the common lands 62 of the monitor slides located at the eight work stations containing the lead defining pattern masks. Current is then applied to terminals 111 and 112 of the eight source structures containing lead. When steady state evaporation of the lead has been attained, shutter 6C is rotated to allow the volatilized lead to pass through the openings therein. When the desired lead coating is attained on the eight substrates, the substrates are shielded by shutter 6C and the deposition of lead ceases.

The remaining steps in the process should now be obvious. Knob 117 is rotated to free shaft 9 and return the masks and substrates to the "at rest" position. Crank 17 is then rotated eight revolutions to position the second group of substrates having a tin and silicon monoxide coating above the lead defining pattern masks and the third group of eight substrates having a tin coating above the source structures containing silicon monoxide. Crank 29 is then operated to rotate monitor shutter 60 one degree to expose the fourth of each of the multiple lands 63 of the monitor slides 72A, 72B, 72C, etc. The resistance meters are connected between the fourth of the multiple lands 63 and the common land 62 of the monitor slides above the source structures containing lead. Next, the second group of substrates receives a lead coating and the third group of substrates receives a silicon monoxide coating. Finally, the third group of substrates receives a lead coating after first rotating crank 17 eight revolutions and crank 29 one degree.

Although only two examples have been described of the way the apparatus may be employed to process a number of substrates, it will be understood that in conjunction with various masks and various shutters a number of different procedures might be followed, as required, to process a maximum of 24 substrates during a single evacuation cycle of the vacuum chamber.

While the invention has been particularly shown and described with reference to preferred embodiments thereof, it will be understood by those skilled in the art that various changes in form and details may be made therein without departing from the spirit and scope of the invention.

What is claimed is:

1. A substrate processing apparatus comprising; a vacuum chamber having a base and a removable member; means for evacuating said chamber; means supporting a plurality of rectangular substrates within said chamber in a first plane substantially parallel with said base, said supporting means being operable to rotate said substrates within said plane; means supporting a plurality of pattern masks within said chamber in a second plane substantially parallel with said base, said second plane being intermediate said base and said first plane; means selectively operable to raise said pattern mask supporting means to cause a first surface of each of said plurality of pattern masks to contact a first surface of one of said plurality of substrates; means causing a predetermined alignment between said contacting pattern mask and said substrate including a plurality of fixed posts, a plurality of yielding members, a first portion of said plurality of yielding members tending to maintain said pattern mask in contact with each of said plurality of posts, and a second portion of said plurality of yielding members tending to maintain said substrate in contact with each of said plurality of posts; a plurality of evaporation source structures containing volatilizable material; and means for operating any of said source structures whereby volatilized material therefrom is directed through one of said pattern masks onto a substrate.

2. The apparatus of claim 1 including means cooling said substrate while said volatilized material is directed thereto; means supporting said cooling means within said chamber in a third plane substantially parallel with said base; and said supporting means being further effective to position said cooling means immediately above and in close spaced relationship with all of said substrates.

3. The apparatus of claim 1 including means for determining the thickness of material deposited on said substrate while said volatilized material is directed thereto; said last named means including a plurality of electrically non-conductive monitor slides one for each of said substrates, each of said slides having an electrically conductive coating on a first portion of a first face and a plurality of parallel electrically conductive coatings on a second portion of said first face; means positioning said slides in said substrate plane whereby each of said slides is located on the same radial axis as a corresponding substrate, means selectively shielding all but one of said parallel coatings and a portion of said other coating, and means connecting a resistance meter to said unshielded coatings, whereby the reading of said meter is indicative of the thickness of material deposited on said substrate.

4. A substrate processing apparatus comprising; a vacuum chamber; means to obtain a vacuum within said chamber; a plurality of planar rectangular substrates; a plurality of planar pattern masks; means supporting said plurality of rectangular substrates in a first plane; means supporting said planar pattern masks in a second plane; said first and second planes being essentially parallel one to another; a plurality of evaporation source structures, each of said source structures rigidly secured within said chamber and effective to direct volatilized material through only one of said plurality of masks; means for selectively positioning any of said substrates above any of said plurality of masks; means selectively operable to cause said masks to contact said substrates whereby a major face of each of said masks is aligned with a major face of a substrate; and means to operate any of said source structures to thereby deposit volatilized material upon said substrate.

5. A substrate processing apparatus comprising; a vacuum chamber including a base and a removable member; means for selectively evacuating said chamber; a first pair of circular rails within said chamber extending in a first plane substantially parallel to said base; means positioning said first pair of rails within said chamber and adapted to rotate said rails horizontally in predetermined increments; a plurality of planar substrates; yielding means holding said substrates on said first pair of rails; a second pair of circular rails within said chamber extending in a second plane substantially parallel to said base; means positioning said second pair of rails within said chamber intermediate said base and said first pair of rails; a plurality of pattern masks; yielding means holding said masks on said second pair of rails; means to selectively elevate said masks until a major face of each of said masks is contiguous with a major face of one of said substrates; said yielding means holding said masks thereafter effective to hold a contiguous substrate; and a plurality of evaporation source structures disposed on said base and effective to vaporize material whereby said vaporized material is directed towards said masks.

6. A substrate processing apparatus comprising; a vacuum chamber including a base and removable member; means for evacuating said chamber; a plurality of work stations within said chamber; each of said work stations including an evaporation source structure, a mask having predetermined openings therein, and a planar substrate in substantially vertical alignment; means supporting all of said substrates in a first plane substantially parallel with said base and selectively operable to rotate all of said substrates within said first plane to position any of said substrates at any of said work stations; means supporting all of said masks in a second plane parallel with said base; a plurality of monitor slides one for each of said work stations; means for supporting each of said slides in said substrate plane and on the same radial axis as each of said substrates; shutter means for said monitor slides, said shutter means including a plurality of radial slots one for each monitor slide, said slots effective to expose a portion of said slides only; means positioning said shutter means immediately below said slides and rotatable to expose a plurality of different portions of said slides; means selectively operable to cause said masks to engage said substrates whereby said predetermined openings expose portions of said substrates; second shutter means effective to shield all but one of said masks and monitor slides from a corresponding source structure; means to rotate said second shutter means about a horizontal axis whereby any of said masks and slides are exposed to a corresponding source structure; and means to operate any of said source structures.

7. A substrate processing apparatus comprising; a vacuum chamber; means to obtain a vacuum within said chamber; a plurality of planar rectangular substrates; a plurality of pattern masks; means supporting said plurality of rectangular substrates in a first horizontal plane; means supporting said plurality of pattern masks in a second horizontal plane; a plurality of evaporation source structures, containing volatilizable material, each of said source structures effective to direct volatilized material through only one of said masks; means for selectively positioning any of said plurality of substrates above any of said plurality of masks; means selectively operable to cause each of said masks to contact one of said substrates; means to align each of said contacting masks and substrates one to another including means to laterally position each substrate with respect to a corresponding mask before contact is attained; and means to operate said source structures to thereby deposit volatilized material upon said substrates.

References Cited in the file of this patent

UNITED STATES PATENTS

| | | |
|---|---|---|
| 1,954,995 | Harrison | Apr. 17, 1934 |
| 2,369,764 | Ullrich | Feb. 20, 1945 |
| 2,391,595 | Richards et al. | Dec. 25, 1945 |
| 2,411,715 | Dimmick | Nov. 26, 1946 |
| 2,463,906 | Pride | Mar. 8, 1949 |
| 2,482,329 | Dimmick | Sept. 20, 1949 |
| 2,614,524 | Haynes | Oct. 21, 1952 |
| 2,665,227 | Clough et al. | Jan. 5, 1954 |